(12) United States Patent
Speck et al.

(10) Patent No.: US 9,050,908 B2
(45) Date of Patent: Jun. 9, 2015

(54) LONGITUDINAL RAIL GUIDE

(75) Inventors: Axel Speck, Haan-Gruiten (DE); Daniel Urban, Düsseldorf (DE); Thomas Thiel, Bonn (DE)

(73) Assignee: C. ROB. HAMMERSTEIN GMBH & CO. KG, Solingen (DE)

( * ) Notice: Subject to any disclaimer, the term of this patent is extended or adjusted under 35 U.S.C. 154(b) by 234 days.

(21) Appl. No.: 13/638,167

(22) PCT Filed: Mar. 28, 2011

(86) PCT No.: PCT/EP2011/054729
§ 371 (c)(1),
(2), (4) Date: Dec. 11, 2012

(87) PCT Pub. No.: WO2011/120920
PCT Pub. Date: Oct. 6, 2011

(65) Prior Publication Data
US 2013/0076085 A1    Mar. 28, 2013

(30) Foreign Application Priority Data

Mar. 31, 2010  (DE) .......................... 10 2010 003 568
Aug. 10, 2010  (DE) .......................... 10 2010 039 157

(51) Int. Cl.
*F16M 13/00*  (2006.01)
*B60N 2/08*  (2006.01)
(Continued)

(52) U.S. Cl.
CPC ................ *B60N 2/08* (2013.01); *B60N 2/0705* (2013.01); *B60N 2/0806* (2013.01); *B60N 2/0875* (2013.01); *B60N 2/0881* (2013.01); *B60N 2/427* (2013.01)

(58) Field of Classification Search
CPC .. B60N 2/0705; B60N 2/0715; B60N 2/0875; B60N 2/0818; B60N 2/0881; B60N 2/427
USPC ............... 248/430, 429, 424; 297/344.1, 472, 297/473; 296/68.1
See application file for complete search history.

(56) References Cited

U.S. PATENT DOCUMENTS 6,113,051 A * 9/2000 Moradell et al. ............... 248/430
6,637,712 B1 * 10/2003 Lagerweij ..................... 248/429
(Continued)

FOREIGN PATENT DOCUMENTS

DE           42 42 895 C1    11/1993
DE     10 2004 03 144 A1    11/2004
(Continued)

OTHER PUBLICATIONS

International Preliminary Report on Patentability in PCT/EP2011/054729 dated Mar. 5, 2013.
International Search Report in PCT/EP2011/054729 dated Feb. 8, 2013.

*Primary Examiner* — Amy Sterling
(74) *Attorney, Agent, or Firm* — Foley & Lardner LLP

(57) ABSTRACT

A longitudinal rail guide of a motor vehicle seat having a bottom rail, with a top rail which is movable in longitudinal direction relative to the bottom rail and with a locking device. The locking device has a guide part which is disposed on the top rail and has at least one guide opening, and for each guide opening there is a blocking part which is disposed so as to be movable in the guide opening. The guide part has a free edge which lies directly opposite an adjacent inner surface of the bottom rail, and before an accident the free edge is located at a small distance from the adjacent inner surface of the bottom rail and after an accident the free edge bears against the adjacent inner surface.

16 Claims, 3 Drawing Sheets

Figures 1, 2:
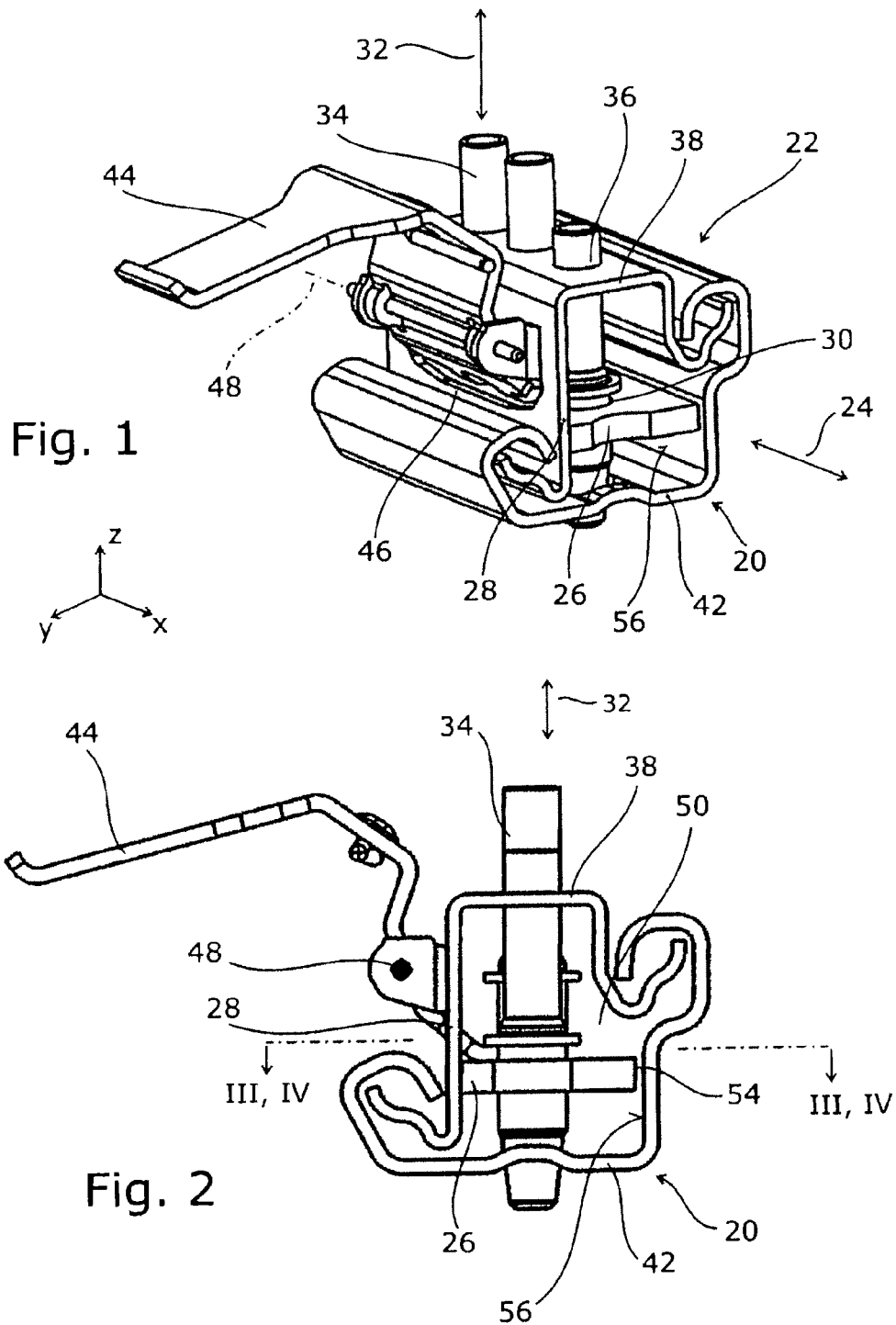

(51) Int. Cl.
   *B60N 2/07*     (2006.01)
   *B60N 2/427*    (2006.01)

(56) References Cited

U.S. PATENT DOCUMENTS 7,722,006 B2 * 5/2010 Beneker et al. ............... 248/424

8,800,948 B2 * 8/2014 Wakayama et al. ........... 248/429

FOREIGN PATENT DOCUMENTS

| DE | 203 13 952 U1 | 1/2005 |
| DE | 102006 47 525 A1 | 5/2007 |
| EP | 0 941 888 A2 | 9/1999 |

* cited by examiner

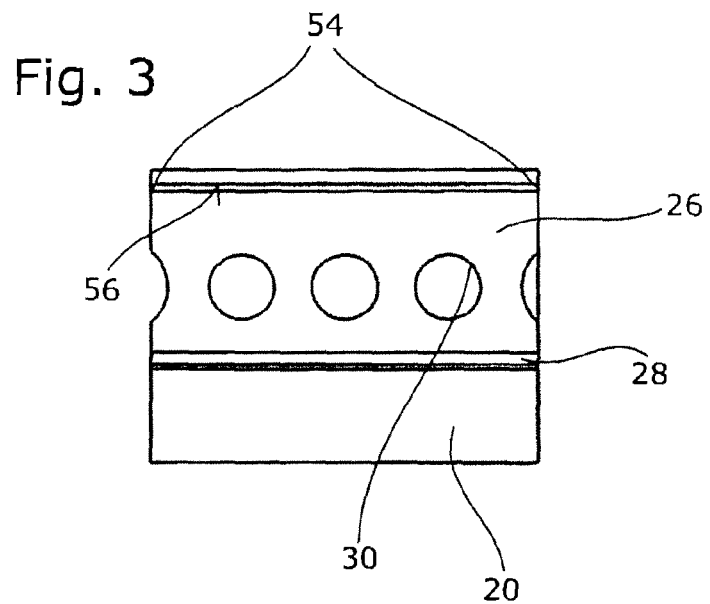
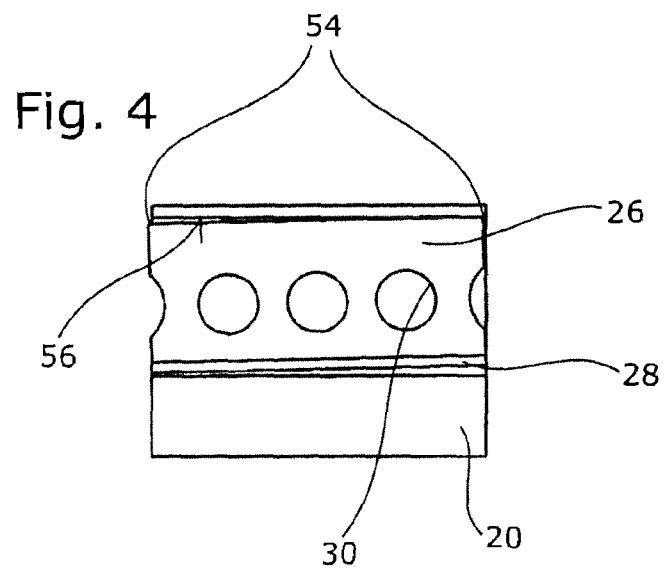

LONGITUDINAL RAIL GUIDE

CROSS REFERENCE TO RELATED APPLICATIONS

The present application is a National Stage of International Application No. PCT/EP2011/054729 filed on Mar. 28, 2011, which claims the benefit of German Patent Application No. 10 2010 039 157.3 filed on Aug. 10, 2010 and which claims the benefit of German Patent Application No. 10 2010 003 568.8 filed on Mar. 31, 2010, the entire disclosures of which are incorporated herein by reference.

The invention relates to a longitudinal rail guide of a motor vehicle seat comprising a bottom rail, a top rail that is displaceable relative to the bottom rail in a longitudinal direction, and a locking device, wherein the locking device comprises a) a guide part which is disposed on the top rail and has at least one guide opening extending transversely to the longitudinal direction, b) for each guide opening one blocking part that is displaceably disposed in the guide opening, and c) latching openings formed in the bottom rail, wherein, in a normally provided blocking state of the locking device, at least one blocking part latches into one of the latching openings, and in an actuated release position, no blocking part latches into a latching opening.

Such a longitudinal rail guide is known from DE 42 42 895 C1. The guide part in this longitudinal rail guide is a section of a U-shaped profile. With its base, the latter is disposed on an inner surface of a side wall of the top rail and has a lower web which protrudes transversely to this side wall and forms the guide part. Four guide openings are provided in this guide part in the exemplary embodiment shown. The locking device comprises four blocking parts in the form of blocking pins. Each blocking pin is associated in the known manner with a single spring which biases the blocking pin into a blocking position. An actuating device is provided which is located outside the two rails; it has a fork-like disengaging part, which pulls all four blocking pawls into the release position upon actuation. The latching openings are provided in a bottom flange of the bottom rail. The top rail and bottom rail are kept spaced from each other and connected via guide means. The guide means permit a longitudinal displacement in the longitudinal direction. The guide means are disposed in diagonally opposite guiding regions. The longitudinal guide is not mirror-symmetrical due to this different arrangement of the guiding regions. Possible guide means include guiding members, lubricants and the like.

Such longitudinal rail guide have proven their worth in principle. Usually, two longitudinal rail guides are provided per seat. The invention has set itself the task of improving the safety of the longitudinal rail guide in such a way that a displacement of the two rails relative to each other occurring in an accident is counteracted even better than in the prior art.

It is the object of the invention to improve the longitudinal rail guide of the type mentioned in the introduction in such a way that, in the locked state, it is capable of absorbing greater forces in an accident than the previously known longitudinal rail guide, without additional components being required.

This object is achieved with a longitudinal rail guide having the features of claim 1.

An accident is, in particular, understood to mean a so-called "crash". The term crash denotes an accident in which the safety devices of a motor vehicle are triggered in which the longitudinal rail guides are located. Usually, the airbags are set off in a crash.

The invention proposes an interaction between at least one free edge, in particular a free edge of the guide part, and an adjacent inner face of the bottom rail during the accident. In this case, the edge or corner is referred to as free if it is directly opposite to the adjacent inner face. Normally, prior to an accident, the edge and adjacent inner face are disposed at a small distance from each other; the distance is selected to be large enough so that maximum production and installation variances never lead to a direct contact. The distance is selected to be so sufficiently small that a deformation of the rails during an accident leads to the free edge coming to rest against the adjacent inner face of the bottom rail. This causes a support; a hooking engagement can occur; the safety of the lock is increased. In other words, wedging occurs. The free corner buries itself in the material of the adjacent inner face.

Advantageously, a longitudinal channel extending in the longitudinal direction is formed between the bottom rail and the top rail. Advantageously, the guide part is accommodated in this longitudinal channel.

Advantageously, an actuating device which is in part accommodated in the longitudinal channel is associated with the locking device.

Particularly advantageous is an embodiment in which the guide part is attached to the top rail only on one side of the blocking part. On one side in this case means on one side of a plane that goes through the blocking part and is spanned by the longitudinal direction and the direction of movement of the blocking part. In other words, the guide part is only unilaterally attached. It freely protrudes into the longitudinal channel from the area of its attachment. The area of attachment of the guide part to the top rail and the guide opening through which the blocking part reaches are laterally offset relative to one another. In this case, laterally offset means offset in the y-direction, with the x-y-z coordinate system that is commonly used in the case of motor vehicles being employed. Because the place of attachment of the guide part on the top rail and the guide opening have a lateral distance from one another, a torque occurs in the event of an accident which leads to the guide part being pivoted about a pivot axis parallel to the direction of movement.

Preferably, this actuating device has a window formed in a side wall of the top rail; the actuating device extends through this window. The top rail is locally weakened by the window; it can deform more easily in the area of the window than at other places of its side wall. The guide part is preferably applied, preferably obtusely applied, below the window to an inner face of the side wall of the top rail. In this way, it participates in a deformation of the side wall in the vicinity of the window, and the contact with the adjacent inner face of the bottom rail is facilitated.

Advantageously, the free edge ends at at least one of its two end portions in a corner, preferably in a sharp corner. This can bury itself in the material of the adjacent inner face in the case of an accident. It is advantageous to provide, on the free edge and/or on the adjacent inner wall, means that permit a better hooking engagement occurring between the free edge and the adjacent inner wall of the bottom rail. Such means comprise, for example, knurled portions, furrowed portions, multiple bore holes, irregularities, roughened portions, ribs, studs, etc. It is also possible to provide a part, between the free edge and the adjacent inner wall, which is destroyed in a crash, e.g. a gliding strip consisting of plastic.

In a preferred embodiment, the free edge is located at an end face of the guide part extending parallel to the longitudinal direction and parallel to the direction of movement of the blocking parts.

Preferably, the blocking parts are located within the longitudinal channel, with the exception of the lower end of the blocking parts which extends through the latching openings.

Preferably, the guide part is as close to the latching openings as possible.

Other advantages and features of the invention become apparent from the other claims as well as from the following description of two exemplary embodiments of the invention, which are to be understood not to be limiting and which will be explained in detail below with reference to the drawing.

Figure 6:
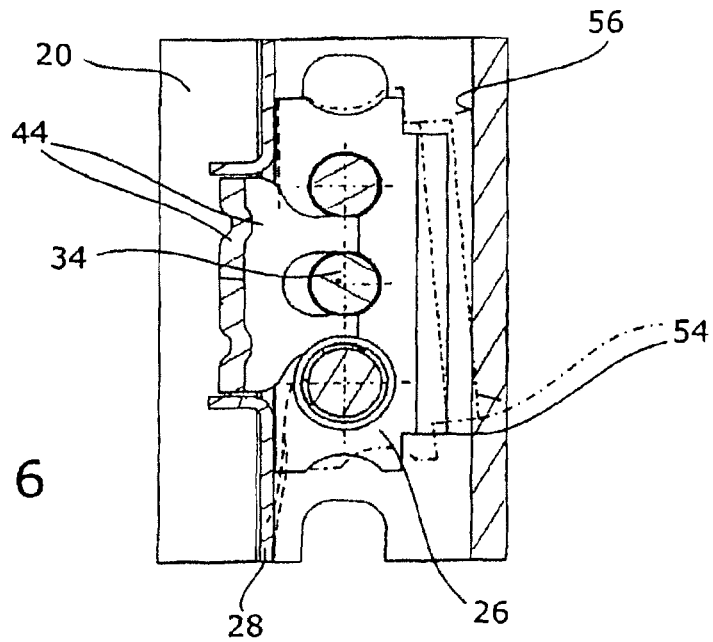
Figure 5:
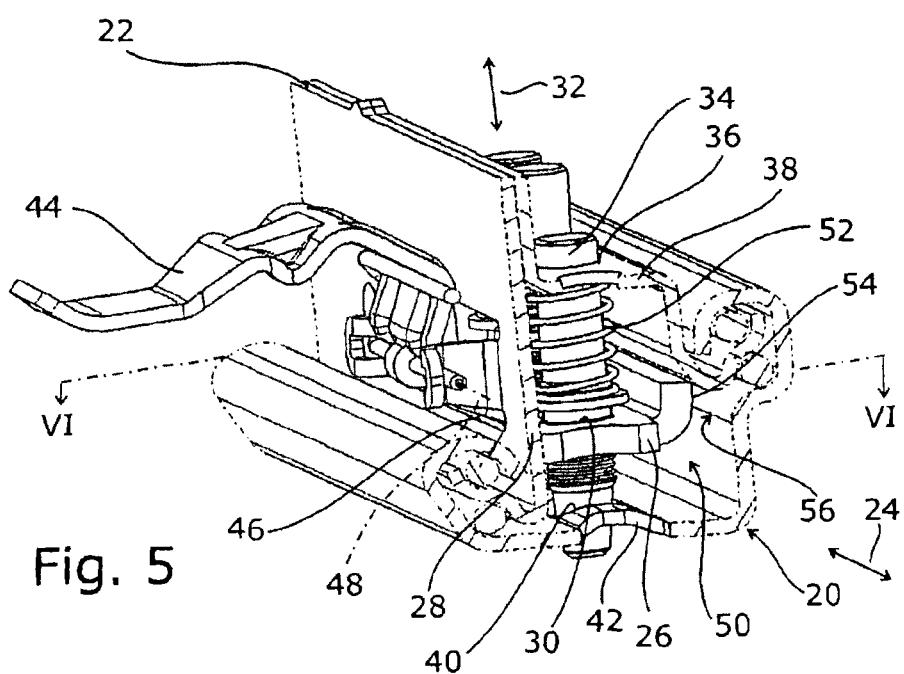

In the drawing:

FIG. 1: shows a perspective view of a short section of a longitudinal rail guide, FIG. 2: shows a frontal view of the longitudinal rail guide according to FIG. 1, FIG. 3: shows a section along the line of cut III-III in FIG. 2, but without blocking parts; what is shown is the normal state prior to an accident, FIG. 4: shows a sectional view like FIG. 3, but now subsequent to an accident, FIG. 5: shows a perspective view of a short portion of a longitudinal rail guide according to a second exemplary embodiment, and FIG. 6: shows a section along the sectional plane VI-VI in FIG. 5.

The longitudinal rail guide according to the first exemplary embodiment, FIGS. 1 to 4, comprises a bottom rail 20 and a top rail 22. The two are displaceable relative to each other in the longitudinal direction 24. The longitudinal rail guide comprises a locking device. The latter comprises a guide part 26, which in the first exemplary embodiment is a substantially rectangular plate. The guide part 26 is obtusely applied, with an end face, to an inner face of a side arm 28 of the top rail 22 and attached; it is, in particular, butt-welded thereto. It is attached only at this location; it cantilevers freely. The guide part 26 comprises a total of three guide openings 30. In the first exemplary embodiment, the guide openings 30 are round; they are centrical with respect to a respective opening axis extending parallel to a direction of movement 32. The guide openings 30 are disposed laterally offset with respect to the area of attachment of the guide part 30; the offset is in the y-direction.

A total of three blocking parts 34 are able to move parallel to the drawn-in direction of movement 32. They are configured as round pins. One blocking part 34, respectively, reaches through a guide opening 30. Moreover, the blocking parts 34 reach through one of three holes 36, respectively, which are provided in an upper transverse web 38 of the top rail 22.

Latching openings 40 are located below the guide openings 30; they are formed in a lower transverse web 42 of the bottom rail 20. As FIG. 1 shows, a front blocking part 34 reaches through one of the latching openings 40; a displacement of the top rail 22 relative to the bottom rail 20 is thus prevented; the longitudinal rail guide is in the blocked state.

In the normal position, i.e. non-actuated, the longitudinal rail guide is in the blocked state. In order to be able to adjust the rails 20, 22 relative to one another, a release position has to be deliberately effected. This is accomplished by means of an actuation device. It comprises a disengagement lever 44 reaching through a window 46 of the side arm 28. It is mounted so as to be pivotable about a pivot axis 48.

The two rails 20, 22 delimit an internal channel 50. The disengagement lever 44 reaches into this internal channel 50. There, it has a fork-like formation, see FIG. 6. It reaches under one collar, respectively, which is provided on each blocking part 34. If the disengagement 44 in the illustration according to FIG. 1 or 2 is pivoted counter-clockwise, all three blocking parts 34 are successively pulled into the release position in which they no longer cooperate with any latching opening 40.

In the known manner, the blocking parts 34 are biased into their blocked state by springs 52. Each single blocking part 34 comprises a spring 52, see FIG. 5.

As is apparent especially from FIGS. 1 and 2, the guide part 26 is located, in the longitudinal direction, at the level of the window 46 and, below this window 46, is attached to the inner face of the side arm 28 in an area of attachment. Opposite this area of attachment, the guide part 26 comprises an end face parallel to a plane which is spanned by the longitudinal direction 24 and the direction of movement 32. This end face defines at least one free edge 54; in the example, it is two free edges 54. Both of them are in the immediate vicinity of an adjacent inner face 56 of the bottom rail 20. The distance thereto is about 0 to 3 mm; preferably a clear distance, i.e. a distance greater than zero, is provided, e.g. a clear distance of 0.6 mm. The adjacent inner face 56 preferably extends also parallel to a plane spanned by the longitudinal direction 24 and the direction of movement 32.

Prior to an accident, the end face or the free edges 54 and the adjacent inner face 56 do not touch. They are spaced at a distance from each other which ensures a proper function of the longitudinal rail guide.

If a load acts on the longitudinal rail guide due to an accident, e.g. due to a frontal impact of the vehicle or a rear impact, the two rails 20, 22 are moved relative to one other due to the accident. A deformation of the blocking parts 34 that are currently engaged occurs. During the accident, a torque on the guide part 26 occurs. Since it is fixed only unilaterally and because a force that substantially acts in the longitudinal direction is introduced, via the blocking part 34 which is in the blocked state, into the guide part 26, the latter tends to rotate or position itself in a transverse position. In the process, it moves in a plane that is parallel to the upper transverse web 38 and to the lower transverse web 42. It turns about an axis that is parallel to the direction of movement 32. Therefore, a deformation of the side arm 28 in the vicinity of the window 46 occurs, where the lateral flange 28 is locally weakened anyway. All of this leads to at least one free edge 54 coming into contact with the adjacent inner face 56. It leads at least to an increased friction.

As FIG. 1, in particular, shows, the front end portion of the free edge 54 has the shape of a corner, preferably a sharp corner. The rear end portion is formed in the same way. With such a sharp corner, the guide part 26 can bury itself in the adjacent inner face 56. In the case of an accident, a corner comes into first contact with the adjacent inner face.

Advantageously, but not shown in the Figures, the free edges 54 are and/or the adjacent inner face 56 is formed in an irregular manner in order to promote a good hooking engagement and an interaction between a free edge 54 and the adjacent inner face 56.

The second exemplary embodiment according to the FIGS. 5 and 6 is described below to the extent that it differs from the first exemplary embodiment. Common features are not mentioned.

The top rail 22 is now composed of two individual profiles. The guiding regions each now accommodate two rows of guiding members; the latter are in turn formed as balls. The guide part 26 now does not have the shape of a plate but is bent upwards at its free end in an L-shape. A free edge 54 is thus placed opposite from the adjacent inner face 56. As FIG. 6 shows, the former can bury itself in the latter. The guide part

54, which is twisted due to an accident, is drawn into FIG. 6 in dash-dotted lines; the deformation of the side arm 28, however, is not shown.

Several forms of kinematic reversal are possible. For example, the latching openings may also be provided in the top rail; in that case, the guide part is disposed on the bottom rail. In another kinematic reversal the free edge 54 is provided not on the guide part 26, but on the adjacent inner face 56 of the bottom rail 20. In that case, the guide part 26 has a surface that can interact with this free edge.

The constructional design of the parts of the longitudinal rail guide, in particular of all components concerned that lie in the force flow path, is realized in such a way that the support of the free edge on the adjacent inner face already occurs in the case of an accident that just about reaches the crash threshold or is only slightly above it.

The distance between the free edge 54 and the adjacent inner face 56 is selected to be so sufficient that the free edge 54 and the inner face 26 do not touch in a normal state of driving and particularly in the case of an accident that are less than a crash. The distance between the two is selected to be sufficiently small so that, in the case of a crash, the free edge 54 actually approaches the adjacent inner face 56 sufficiently and comes into contact with it so that the support according to the invention can occur. This requires a harmonization of all of the components concerned that lie in the force flow path. The locking device must not be too rigid, but also not too soft. The same applies to the other components, particularly the rails.

Preferably, the free edge 54 is located at a distance of ≤2 mm from the adjacent inner face 56 of the bottom rail 20 prior to an accident.

The applicants reserve the right to combine any features and sub-features from the patent claims and/or any features and sub-features from sentences of the description in any form, even if such a combination is not specifically claimed or addressed.

The invention claimed is:

1. Longitudinal rail guide of a motor vehicle seat comprising a bottom rail, a top rail that is displaceable relative to the bottom rail in a longitudinal direction, and a locking device, the locking device comprising:
   a. a guide part which is disposed on a side arm of the top rail and has at least one guide opening,
   b. for each guide opening one blocking part that is displaceably disposed in the guide opening, and
   c. latching openings formed in the bottom rail, wherein, in a normally provided blocking state of the locking device, at least one blocking part latches into one of the latching openings, and in an actuated release position, no blocking part latches into a latching opening,
   wherein the side arm of the top rail has a locally weakened area located at least one of above and below the guide part,
   wherein the guide part has a free edge which is immediately opposite to an adjacent inner face of the bottom rail, wherein the guide part is movable from a first position to a second position in the event of an accident,
   wherein, in the first position, the free edge is located at a small distance from the adjacent inner face of the bottom rail and, in the second position, rests against the adjacent inner face.

2. Longitudinal rail guide according to claim 1, wherein a longitudinal channel extending in the longitudinal direction is formed between the bottom rail and the top rail, that in the longitudinal channel an inner face of the top rail lies opposite to the adjacent inner face in a plane which extends transversely to the longitudinal direction and transversely to a direction of movement of the at least one blocking part, and that the guide part is attached to the inner face of the top rail.

3. Longitudinal rail guide according to claim 1, wherein the free edge is located at an end face of the blocking part and that the end face extends at least one of parallel to the longitudinal direction and parallel to a direction of movement of the at least one blocking part.

4. Longitudinal rail guide according to claim 1, wherein the free edge transitions into a sharp corner, in particular a 90° corner, at least one end portion of the guide part located in the longitudinal direction.

5. Longitudinal rail guide of a motor vehicle seat comprising a bottom rail, a top rail that is displaceable relative to the bottom rail in a longitudinal direction, and a locking device, the locking device comprising:
   a. a guide part which is disposed on the top rail and has at least one guide opening,
   b. for each guide opening one blocking part that is displaceably disposed in the guide opening, and
   c. latching openings formed in the bottom rail, wherein, in a normally provided blocking state of the locking device, at least one blocking part latches into one of the latching openings, and in an actuated release position, no blocking part latches into a latching opening,
   wherein the guide part has a free edge which is immediately opposite to an adjacent inner face of the bottom rail, wherein the guide part is movable from a first position to a second position in the event of an accident,
   wherein, in the first position, the free edge is located at a small distance from the adjacent inner face of the bottom rail and, in the second position, rests against the adjacent inner face,
   wherein the locking device further comprises an actuating device, and that the top rail comprises a window through which the actuating device extends.

6. Longitudinal rail guide according to claim 5, wherein the guide part is attached below the window to an inner face of the top rail.

7. Longitudinal rail guide according to claim 1, wherein the distance between the free edge and the adjacent inner face of the bottom rail is between 0.4 and 0.8 mm.

8. Longitudinal rail guide according to claim 1, wherein the free edge, moves in a plane that extends transversely to the longitudinal direction and transversely to a direction of movement of the at least one blocking part as the guide part moves from the first position to the second position.

9. Longitudinal rail guide of a motor vehicle seat comprising a bottom rail, a top rail that is displaceable relative to the bottom rail in a longitudinal direction, and a locking device, the locking device comprising:
   a. a guide part which is disposed on the top rail and has at least one guide opening,
   b. for each guide opening one blocking part that is displaceably disposed in the guide opening, and
   c. latching openings formed in the bottom rail, wherein, in a normally provided blocking state of the locking device, at least one blocking part latches into one of the latching openings, and in an actuated release position, no blocking part latches into a latching opening,
   wherein the guide part has a free edge which is immediately opposite to an adjacent inner face of the bottom rail, wherein the guide part is movable from a first position to a second position in the event of an accident, wherein, in the first position, the free edge is located at a small distance from the adjacent inner face of the bottom rail and, in the second position, rests against the adjacent inner face, wherein the top rail comprises an upper flange, and that the guide part is disposed closer to the latching openings than to the upper flange.

10. Longitudinal rail guide according to claim 1, wherein a longitudinal channel extending in the longitudinal direction is formed between the bottom rail and the top rail, and that the guide part is accommodated in the longitudinal channel.

11. Longitudinal rail guide according to claim 1, wherein the top rail comprises an upper flange, and that the guide part extends parallel to the upper flange.

12. Longitudinal rail guide according to claim 1, wherein a side wall of the top rail extends at least one of parallel to the longitudinal direction and parallel to a direction of movement of the at least one blocking part, and that the guide part is attached only to the side arm.

13. Longitudinal rail guide according to claim 12, wherein an area of the side arm to which the guide part is attached is as distant as possible from at least one of a bend of the side wall about a bending line parallel to the longitudinal direction and the at least one guide opening.

14. Longitudinal rail guide according to claim 12, wherein there is a lateral distance, which is greater than 5 mm, between a single area of attachment at which the guide part is attached to the top rail, and the at least one guide opening.

15. Longitudinal rail guide according to claim 12, wherein there is a lateral distance, which is greater than 10 mm, between a single area of attachment at which the guide part is attached to the top rail, and the at least one guide opening.

16. Longitudinal rail guide according to claim 1, wherein the distance between the free edge and the adjacent inner face of the bottom rail is approximately 0.6 mm.

* * * * *